US012790434B2

(12) United States Patent
Kim et al.

(10) Patent No.: US 12,790,434 B2
(45) Date of Patent: Nov. 10, 2026

(54) CYCLIC OLEFIN POLYMER HAVING EPOXY FUNCTIONAL GROUP PREPARED BY RING-OPENING METATHESIS POLYMERIZATION

(71) Applicant: KOREA ADVANCED INSTITUTE OF SCIENCE AND TECHNOLOGY, Daejeon (KR)

(72) Inventors: Sang-Youl Kim, Daejeon (KR); Jong-Ho So, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 754 days.

(21) Appl. No.: 18/189,250

(22) Filed: Mar. 24, 2023

(65) Prior Publication Data

US 2023/0257514 A1 Aug. 17, 2023

Related U.S. Application Data

(63) Continuation of application No. PCT/KR2023/000301, filed on Jan. 6, 2023.

(30) Foreign Application Priority Data

Feb. 8, 2022 (KR) ........................ 10-2022-0016322

(51) Int. Cl.

| | |
|---|---|
| ***C08G 61/08*** | (2006.01) |
| ***C08G 61/06*** | (2006.01) |
| ***C08L 65/00*** | (2006.01) |

(52) U.S. Cl.

CPC .............. *C08G 61/08* (2013.01); *C08L 65/00* (2013.01); *C08G 2261/3324* (2013.01); *C08G 2261/418* (2013.01); *C08G 2261/724* (2013.01); *C08L 2201/50* (2013.01); *C08L 2203/16* (2013.01)

(58) Field of Classification Search

CPC .. C08G 61/06; C08G 61/08; C08G 2261/724; C08G 2261/418

See application file for complete search history.

(56) References Cited

U.S. PATENT DOCUMENTS

| | | | | |
|---|---|---|---|---|
| 8,481,166 | B2 * | 7/2013 | Takahashi | C08G 61/08 526/280 |
| 9,056,938 | B2 * | 6/2015 | Sunaga | B29C 33/38 |
| 9,951,247 | B2 * | 4/2018 | Endo | B32B 15/20 |
| 10,035,889 | B2 * | 7/2018 | Sunaga | C08J 5/18 |
| 10,233,301 | B2 * | 3/2019 | Kato | C08K 3/24 |
| 10,253,137 | B2 * | 4/2019 | Hayano | C08G 61/08 |
| 10,351,664 | B2 * | 7/2019 | Kato | C08K 3/013 |
| 10,519,288 | B2 * | 12/2019 | Kato | C08K 7/14 |
| 11,474,429 | B2 * | 10/2022 | Oda | B29C 33/38 |
| 11,879,029 | B2 * | 1/2024 | Kamei | B32B 27/325 |
| 2016/0311970 | A1 | 10/2016 | Claverie | |
| 2020/0338807 | A1 * | 10/2020 | Oda | B29C 59/002 |

FOREIGN PATENT DOCUMENTS

| | | | | |
|---|---|---|---|---|
| CN | 1834785 | A | 9/2006 | |
| JP | 2015187219 | A * | 10/2015 | C08G 61/08 |
| KR | 10-2015-0123846 | A | 11/2015 | |
| WO | 2014129486 | A1 | 8/2014 | |
| WO | WO-2021024956 | A1 * | 2/2021 | C08K 3/36 |

OTHER PUBLICATIONS

JP 2015-187219 A (Oct. 29, 2015); machine translation. (Year: 2015).*

M.J. Abadie et al., New catalysts for linear polydicyclopentadiene synthesis, European Polymer Journal vol. 36 (2000) pp. 1213-1219.

Kunal Wazarkar et al., Microencapsulation: An Emerging Technique in Modern Coating Industry, RSC Advances. 2016, vol. 6, pp. 10694-106979.

* cited by examiner

*Primary Examiner* — Rip A Lee

(74) *Attorney, Agent, or Firm* — Shih IP Law Group, PLLC.

(57) ABSTRACT

The present disclosure relates to a cyclic olefin polymer having an epoxy functional group prepared by ring-opening metathesis polymerization and method of preparing the same.

5 Claims, 12 Drawing Sheets

【FIG. 1A】
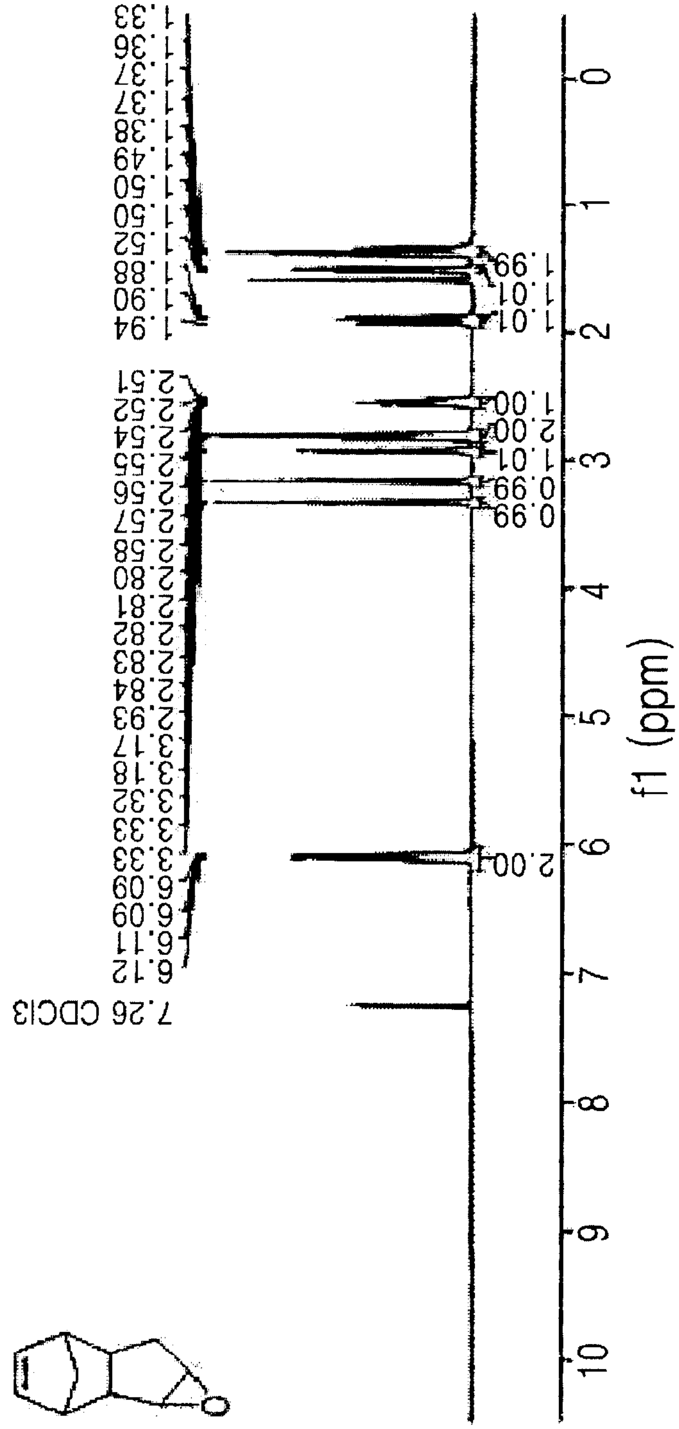

【FIG. 1B】
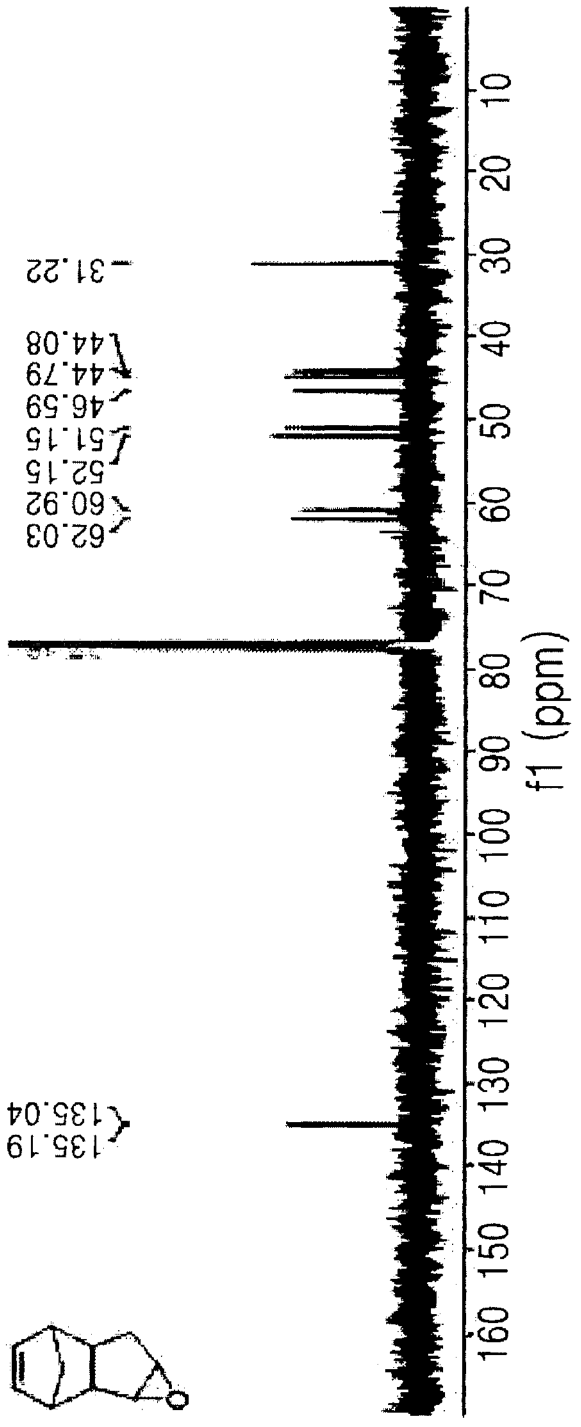

【FIG. 2A】
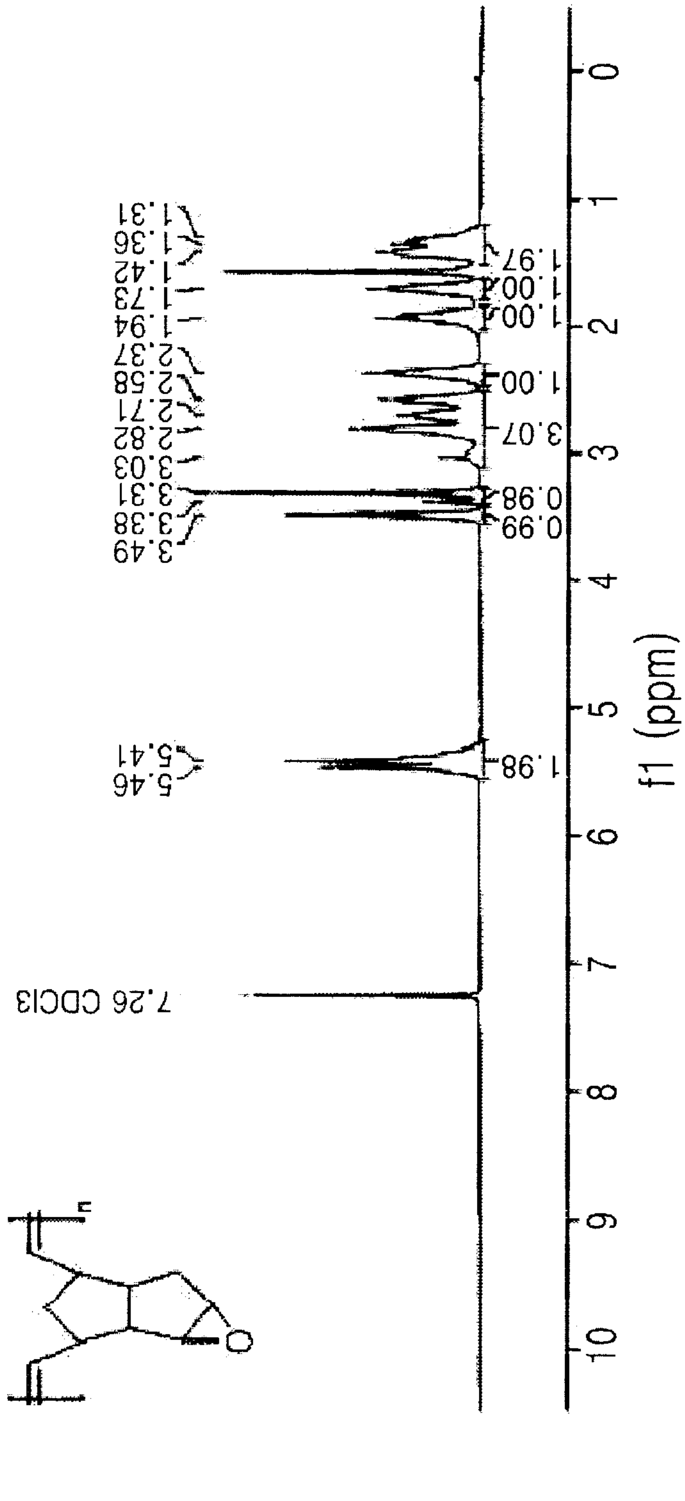

【FIG. 2B】
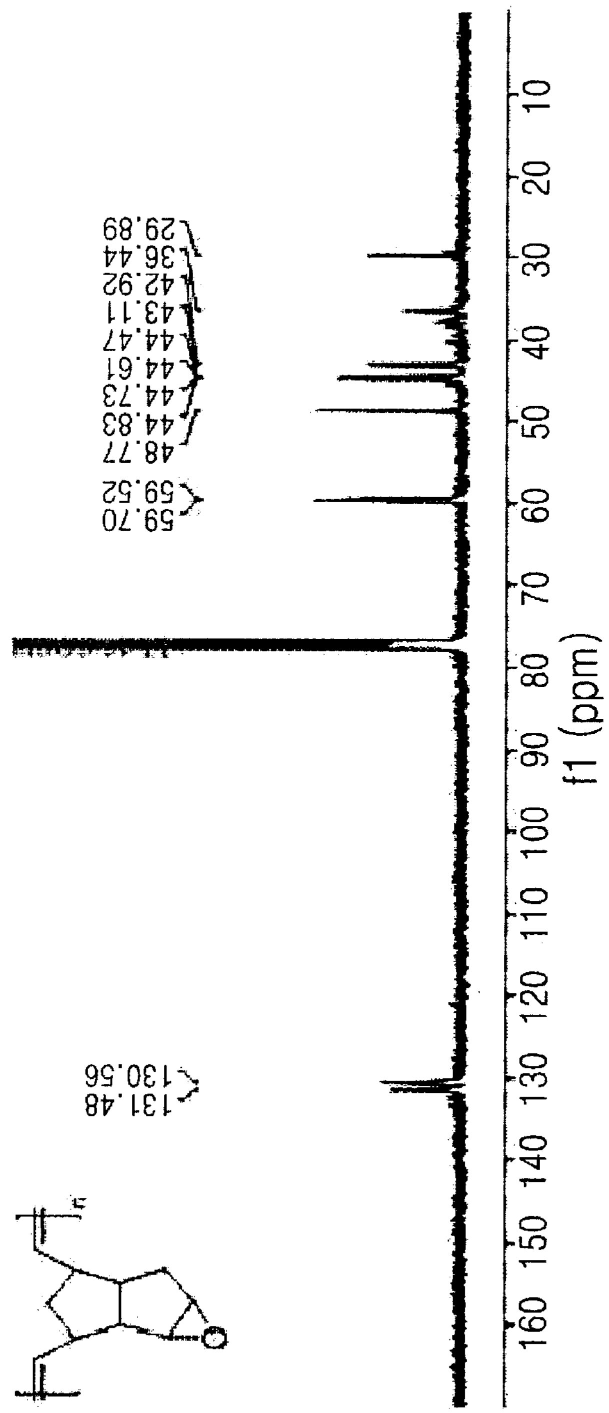

【FIG. 3A】
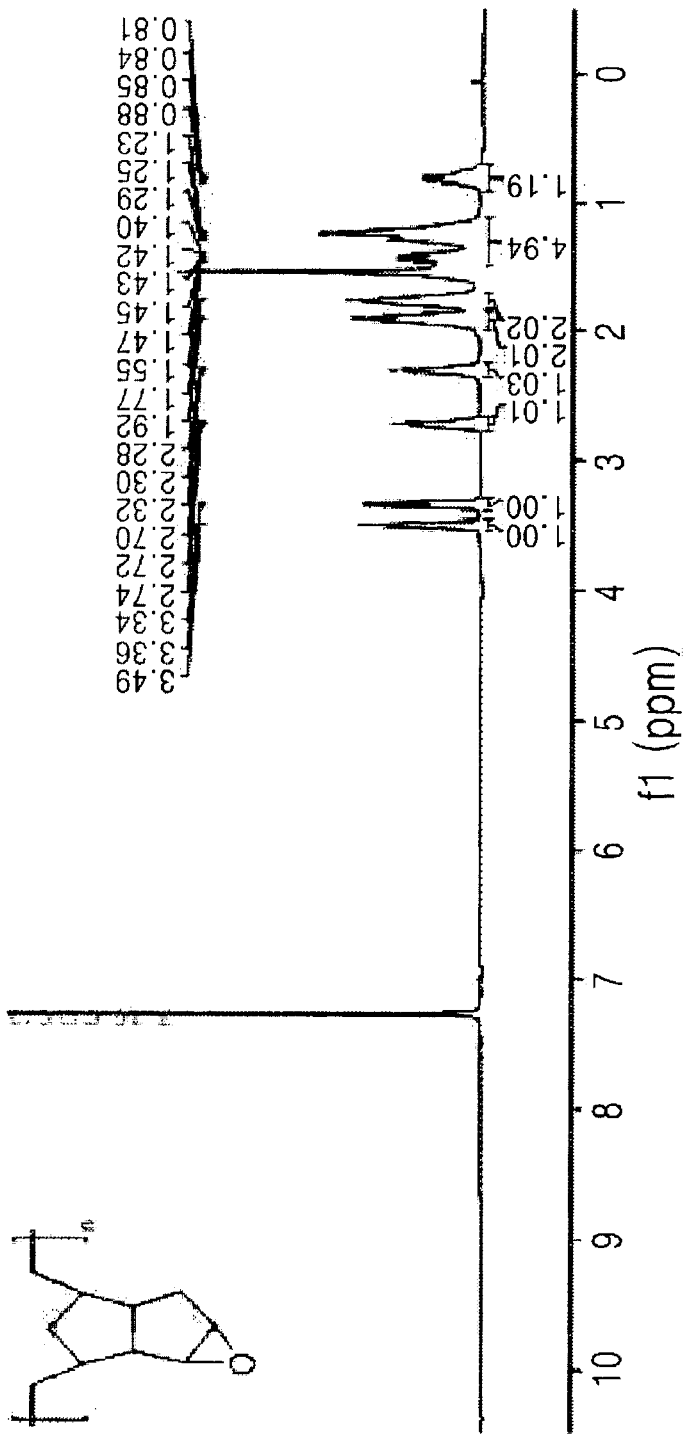

【FIG. 3B】
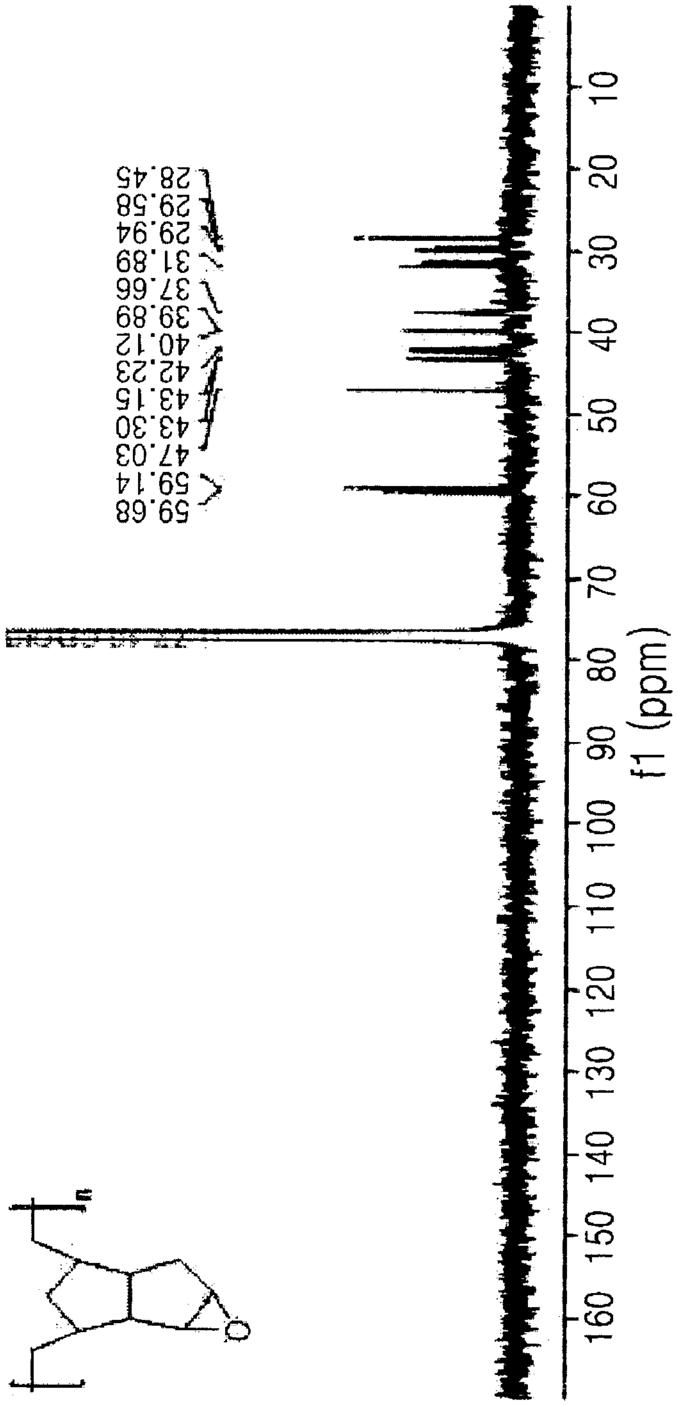

【FIG. 4】
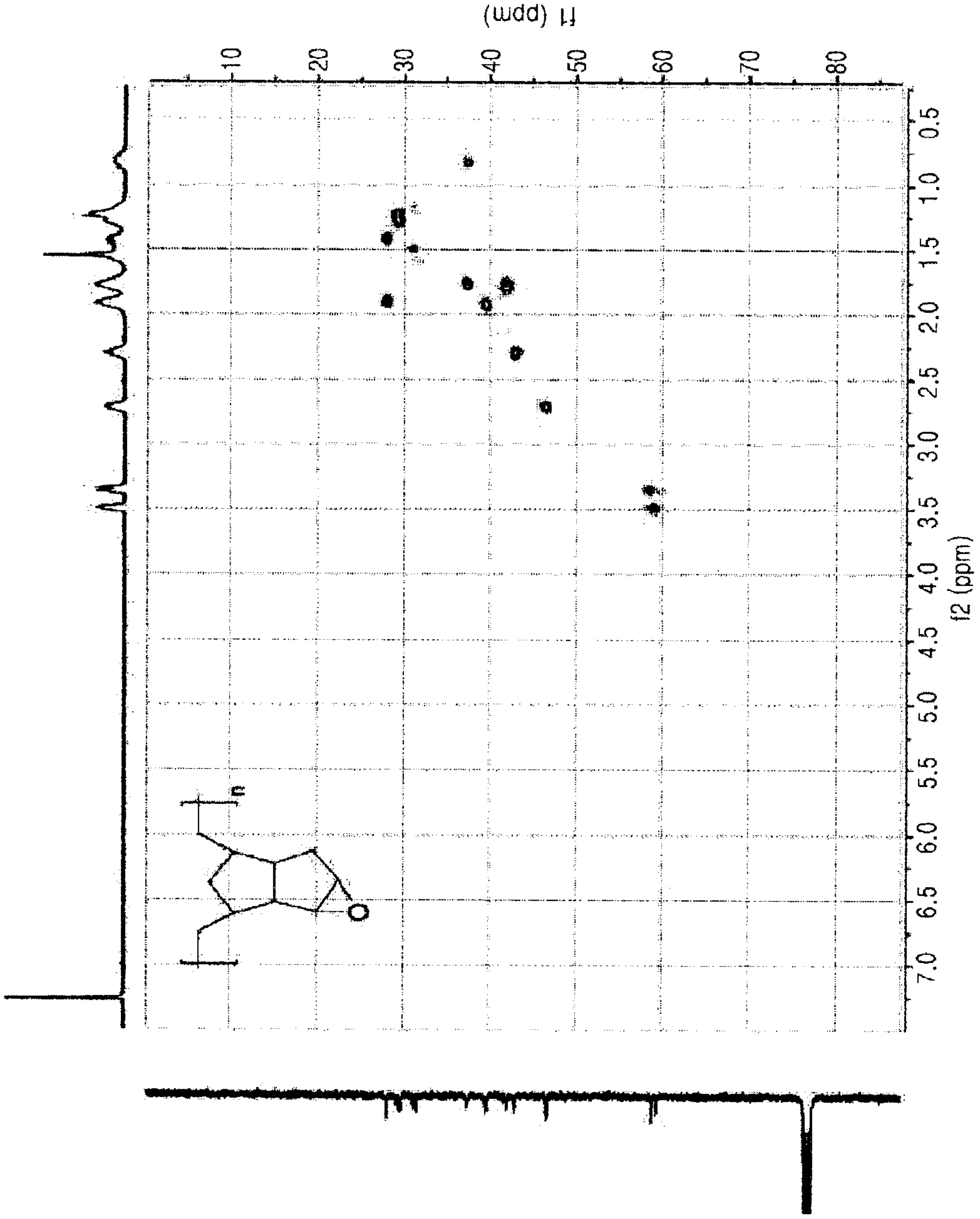

【FIG. 5】
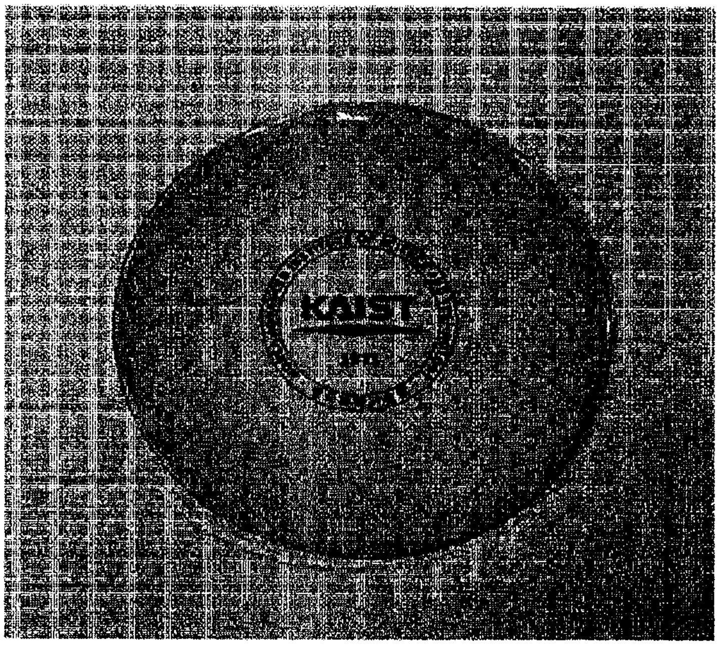

【FIG. 6】
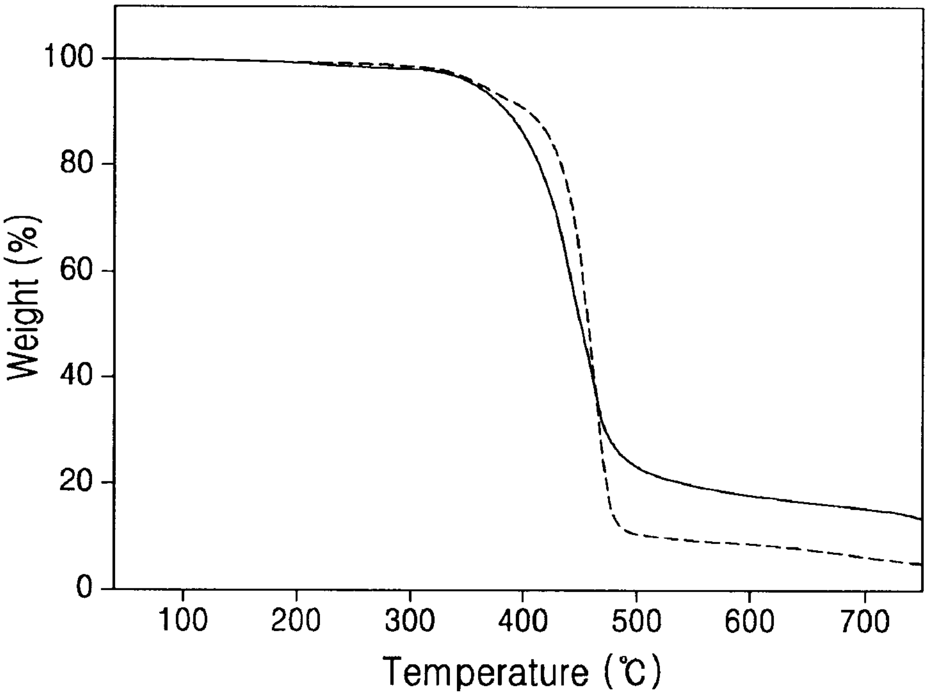

【FIG. 7】
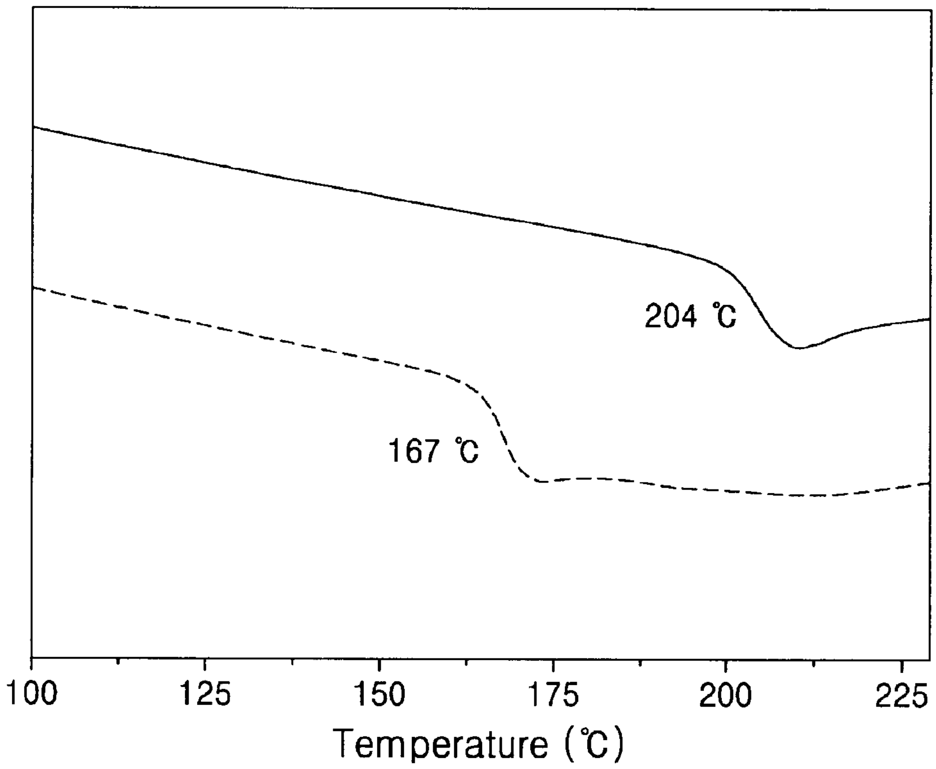

【FIG. 8】
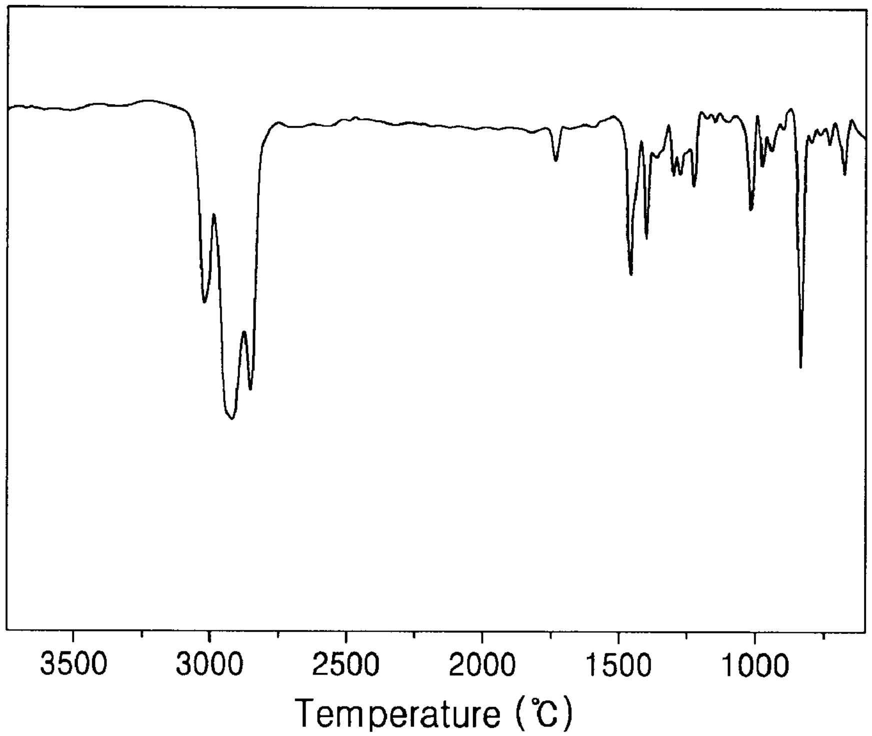

【FIG. 9】
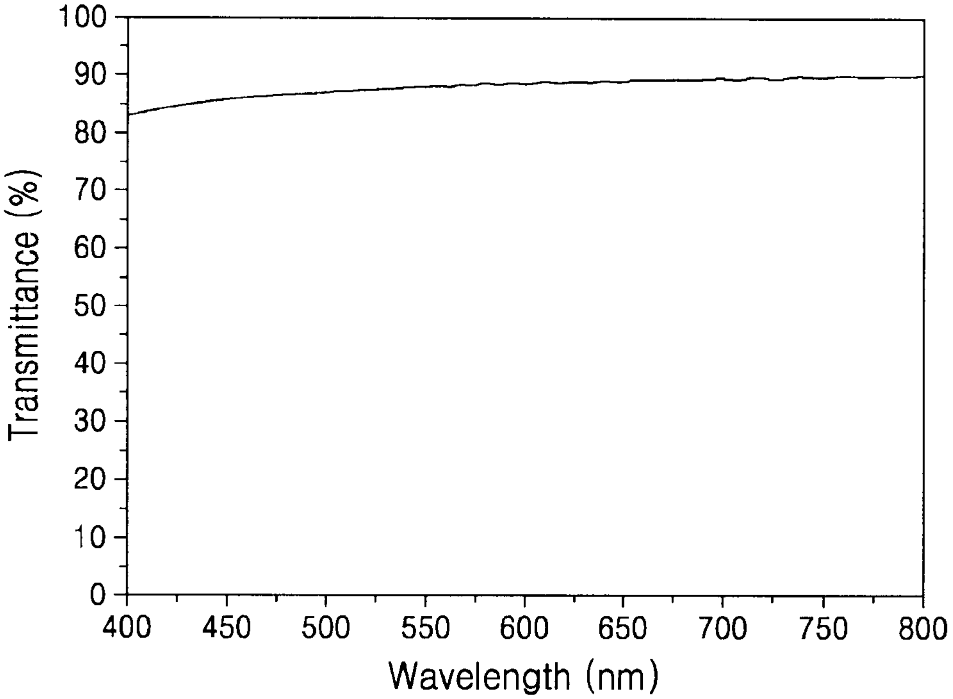

CYCLIC OLEFIN POLYMER HAVING EPOXY FUNCTIONAL GROUP PREPARED BY RING-OPENING METATHESIS POLYMERIZATION

CROSS-REFERENCE TO RELATED APPLICATIONS

This application is a continuation of PCT Application No. PCT/KR2023/000301, filed on Jan. 6, 2023, which claims priority to Korean Patent Application Number 10-2022-0016322, filed on Feb. 8, 2022, both of which are hereby incorporated by reference in their entirety.

TECHNICAL FIELD

The present disclosure relates to a cyclic olefin polymer having an epoxy functional group prepared by ring-opening metathesis polymerization and method of preparing the same.

BACKGROUND

A cyclic olefin-based polymer refers to an amorphous transparent polymer obtained by the polymerization of cyclic monomers. Transparent polymers with excellent optical properties have gained significant attention in a broad range of applications including optical, packaging, electronics, medical devices, and microfluidic devices. Polymethylmethacrylate and polycarbonate have been widely used as polymer materials for optical polymers, but they have seen limited use for optical applications due to their high birefringence and low thermal stability.

However, cyclic olefin-based polymers have various merits such as low birefringence, high transparency, high thermal stability, and high chemical resistance, and thus have been explored for various optical applications.

In general, cyclic olefin-based polymers are classified into cyclic olefin polymers (COPs) and cyclic olefin copolymers (COCs) depending on synthesis methods. The COPs are polymers prepared by ring-opening metathesis polymerization (ROMP), followed by the hydrogenation of double bonds of a main chain. The ROMP uses norbornene-based monomers having high ring strain. When the ring is opened, ring strain with high energy is relieved, which facilitates polymerization and makes it possible to prepare a polymer with a high molecular weight. The following hydrogenation increases the flexibility of the main chain, and thus, the glass transition temperature ($T_g$) decreases, but the chemical resistance and thermal stability are improved.

Representative examples may include poly(dicyclopentadiene) (PDCPD) which is a homopolymer of dicyclopentadiene (DCPD). DCPD can be easily obtained from petroleum, is cheap, and has excellent polymerization reactivity to catalysts. Therefore, DCPD is suitable as a monomer for synthesizing a cyclic olefin-based polymer. However, DCPD has two kinds of double bonds having ring strain in a molecule, and thus, crosslinking may occur during polymerization. In this case, when a film is produced through a process, it can become locally insoluble, and therefore, its transparency and processability decrease. It is known that PDCPD which has undergone hydrogenation exhibits a low glass transition temperature of about 100° C. and includes crosslinked chains.

The COCs are obtained by vinyl addition copolymerization using a catalyst. According to this method, cyclic olefin is copolymerized with ethylene or α-olefin, and, thus, COCs can be easily synthesized by introducing various comonomers. However, the COCs prepared from cyclic olefin and ethylene or α-olefin are limited in properties (for example, adhesion) because of the structural limitation composed of hydrocarbons only.

To address the shortcomings of the cyclic olefin-based polymers, COCs have been developed using a multicyclic monomer with limited rotation and mobility of a polymer chain, a monomer including a large volume substituent, or a monomer introduced with a functional group (for example, an ester group). A substituent consisting of a multicyclic chain with a large volume decreases a chain mobility. The glass transition temperature is improved when a chain-chain interaction is increased or a chain mobility is decreased. A cyclic olefin-based polymer with high transparency, low birefringence, high thermal stability, high chemical resistance, and high glass transition temperature can be readily prepared using a multicyclic monomer having a functional group. However, producing and purifying the monomer in this case is a challenging task mainly due to the synthetic complexity.

PRIOR ART DOCUMENT

New catalysts for linear polydicyclopentadiene synthesis (M. J. Abadie, M. Dimonie, Christine Couve, V. Dragutanc).

DISCLOSURE OF THE INVENTION

Problems to be Solved by the Invention

The present disclosure provides a method of preparing a cyclic olefin-based polymer introduced with functional groups and having a glass transition temperature of about 150° C. or more, high-temperature durability and high transmittance as a method for synthesis and ring-opening metathesis polymerization of monomers introduced with an epoxy functional group.

However, problems to be solved by the present disclosure are not limited to the above-described problems. Although not described herein, other problems to be solved by the present disclosure can be clearly understood by a person with ordinary skill in the art from the following description.

Means for Solving the Problems

A first aspect of the present disclosure provides a cyclic olefin polymer that is produced by ring-opening metathesis polymerization of at least one monomer(s) selected from dicyclopentadiene having an epoxy group represented by the following Chemical Formula 1 and tricyclopentadiene having an epoxy group represented by the following Chemical Formula 2; or by ring-opening metathesis polymerization of at least one monomer(s) selected from the dicyclopentadiene having an epoxy group and the tricyclopentadiene having an epoxy group, and a norbornene monomer represented by the following Chemical Formula 3; and the cyclic olefin polymer includes repeating units represented by the following Chemical Formula 4, Chemical Formula 5, Chemical Formula 6, Chemical Formula 7, Chemical Formula 8, or Chemical Formula 9:

[Chemical Formula 1]

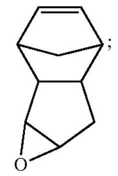

[Chemical Formula 2]

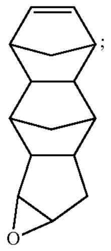

[Chemical Formula 3]

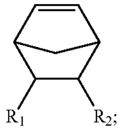

[Chemical Formula 4]

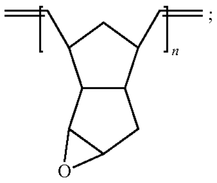

[Chemical Formula 5]

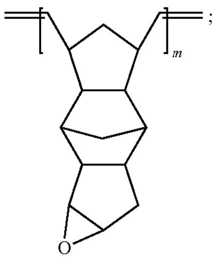

[Chemical Formula 6]

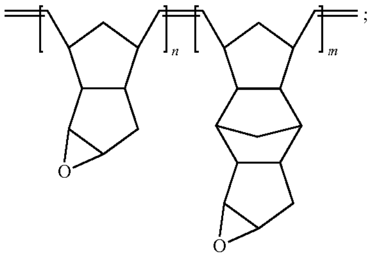

[Chemical Formula 7]

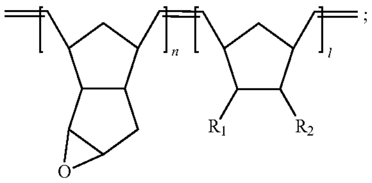

-continued

[Chemical Formula 8]

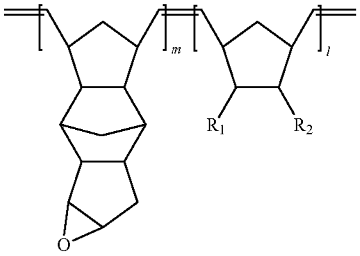

[Chemical Formula 9]

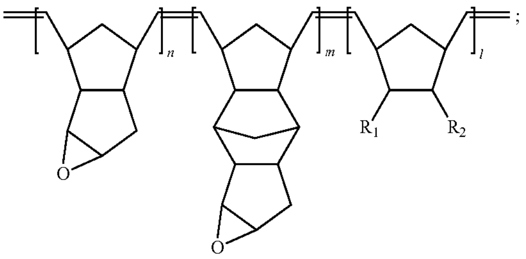

in the above Chemical Formula 3, Chemical Formula 4, Chemical Formula 5, Chemical Formula 6, Chemical Formula 7, Chemical Formula 8, and Chemical Formula 9, n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group ($-COOR_3$), or an amide group ($-CONHR_3$), and $R_3$ is a linear or branched alkyl group having 1 to 20 carbon atoms.

A second aspect of the present disclosure provides a hydrogenated cyclic olefin polymer that is produced by hydrogenation of a cyclic olefin polymer of the first aspect, and the hydrogenated cyclic polymer includes repeating units represented by the following Chemical Formula 10, Chemical Formula 11, Chemical Formula 12, Chemical Formula 13, Chemical Formula 14, or Chemical Formula 15:

[Chemical Formula 10]

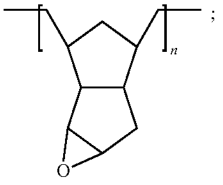

[Chemical Formula 11]

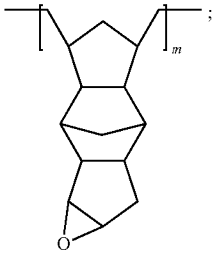

-continued

[Chemical Formula 12]

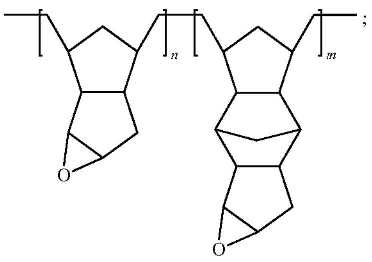

[Chemical Formula 13]

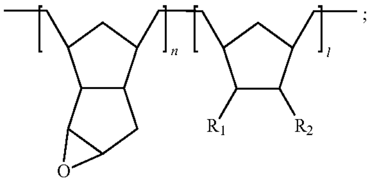

[Chemical Formula 14]

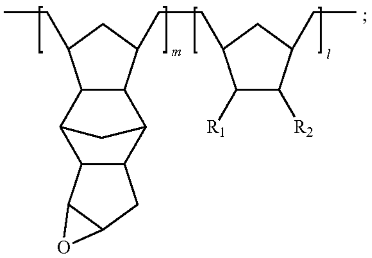

[Chemical Formula 15]

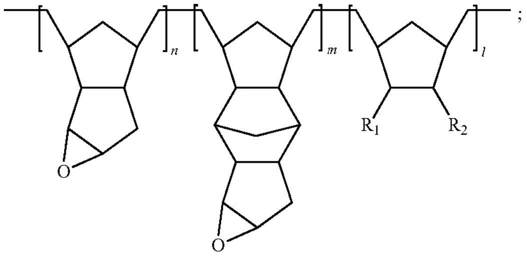

in the above Chemical Formula 10, Chemical Formula 11, Chemical Formula 12, Chemical Formula 13, Chemical Formula 14, and Chemical Formula 15, n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group ($—COOR_3$), or an amide group ($—CONHR_3$), and $R_3$ is a linear or branched alkyl group having 1 to 20 carbon atoms.

A third aspect of the present disclosure provides a method of preparing a hydrogenated cyclic olefin polymer including: (a) polymerizing at least one monomer(s) selected from dicyclopentadiene having an epoxy group represented by the following Chemical Formula 1 and tricyclopentadiene having an epoxy group represented by the following Chemical Formula 2; or at least one monomer(s) selected from the dicyclopentadiene having an epoxy group and the tricyclopentadiene having an epoxy group, and a norbornene monomer represented by the following Chemical Formula 3; in the presence of a first-generation Grubbs catalyst to obtain a cyclic olefin polymer; and (b) hydrogenating the cyclic olefin polymer to obtain a hydrogenated cyclic olefin polymer that includes repeating units represented by the following Chemical Formula 10, Chemical Formula 11, Chemical Formula 12, Chemical Formula 13, Chemical Formula 14, or Chemical Formula 15:

[Chemical Formula 1]

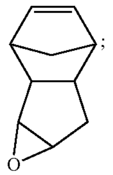

[Chemical Formula 2]

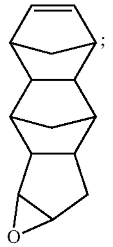

[Chemical Formula 3]

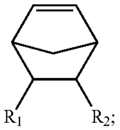

[Chemical Formula 10]

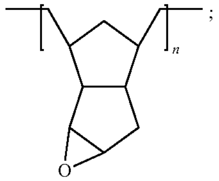

[Chemical Formula 11]

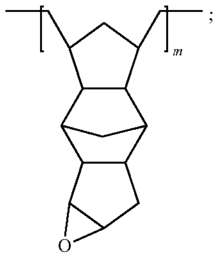

[Chemical Formula 12]

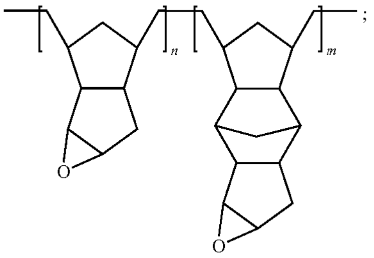

-continued

[Chemical Formula 13]

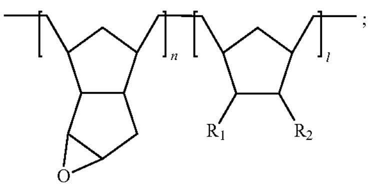

[Chemical Formula 14]

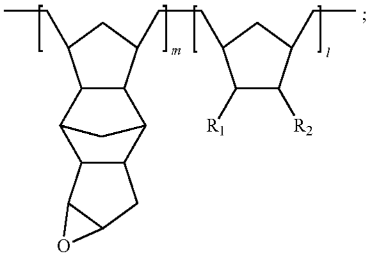

[Chemical Formula 15]

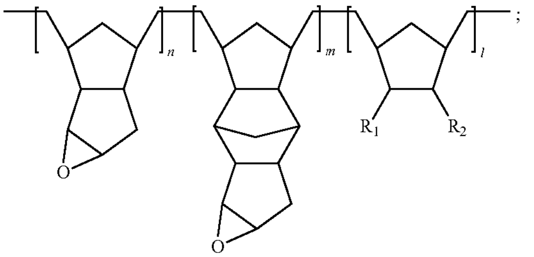

in the above Chemical Formula 3, Chemical Formula 10, Chemical Formula 11, Chemical Formula 12, Chemical Formula 13, Chemical Formula 14, and Chemical Formula 15, n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group ($-COOR_3$), or an amide group ($-CONHR_3$), and $R_3$ is a linear or branched alkyl group having 1 to 20 carbon atoms.

Effects of the Invention

A hydrogenated cyclic olefin polymer according to embodiments of the present disclosure is introduced with an epoxy functional group that is a small-sized polar functional group, and thus, a chain-chain interaction is increased. Therefore, the hydrogenated cyclic olefin polymer can have a glass transition temperature of at least about 150° C., or at least about 160° C.

The hydrogenated cyclic olefin polymer according to embodiments of the present disclosure has a high solubility in chlorinated solvents. Therefore, a polymer film can be easily obtained by a solution casting method.

The hydrogenated cyclic olefin polymer according to embodiments of the present disclosure can be used in preparing an optically-isotropic film.

A film prepared using the hydrogenated cyclic olefin polymer according to embodiments of the present disclosure can have a transmittance of at least about 80%, at least about 83%, or at least about 85% in the region of about 400 nm to about 800 nm.

The cyclic olefin polymer according to embodiments of the present disclosure can be applied to a broad range of applications including optical devices, packaging, electronics, medical devices, and microfluidic devices.

The cyclic olefin polymer according to embodiments of the present disclosure can have low birefringence, high transparency, high thermal stability, and high chemical resistance.

When the hydrogenated cyclic olefin polymer according to embodiments of the present disclosure is prepared, a compound having a norbornene ring introduced with an epoxy functional group is obtained as a byproduct but is not involved in polymerization. Therefore, it is possible to obtain a cyclic olefin polymer having a target molecular weight easily and efficiently without a separate isolation process.

A catalyst used for preparing the hydrogenated cyclic olefin polymer according to embodiments of the present disclosure does not have reactivity with the epoxy functional group. Therefore, a side reaction may not occur in polymerization and hydrogenation.

The hydrogenated cyclic olefin polymer further including a norbornene monomer according to embodiments of the present disclosure may have improved properties such as tensile strength, elasticity, or adhesion.

BRIEF DESCRIPTION OF THE DRAWINGS

FIG. 1A is a $^1H$ NMR spectrum of epoxidized dicyclopentadiene which is a monomer compound 1 prepared according to an example of the present disclosure, and FIG. 1B is a $^{13}C$ NMR spectrum of the compound.

FIG. 2A is a $^1H$ NMR spectrum of a polymer represented by poly(1) in a Reaction Formula 2 according to an example of the present disclosure, and FIG. 2B is a $^{13}C$ NMR spectrum of the poly(1).

FIG. 3A is a $^1H$ NMR spectrum of a polymer represented by H-poly(1) in a Reaction Formula 3 according to an example of the present disclosure, and FIG. 3B is a $^{13}C$ NMR spectrum of the H-poly(1).

FIG. 4 is a $^1H$—$^{13}C$ HSQC NMR spectrum of a polymer represented by H-poly(1) in a Reaction Formula 3 according to an example of the present disclosure.

FIG. 5 is a photograph of a film prepared using the polymer represented by H-poly(1) in the Reaction Formula 3 according to an example of the present disclosure.

FIG. 6 is a graph of thermogravimetric analysis in a nitrogen atmosphere. The solid line indicates a graph of the polymer represented by poly(1) in the Reaction Formula 2 according to an example of the present disclosure, and the dotted line indicates a graph of the polymer represented by H-poly(1) in the Reaction Formula 3 according to an example of the present disclosure.

FIG. 7 is a graph of differential scanning calorimetry in a nitrogen atmosphere. Herein, the solid line indicates a graph of the polymer represented by poly(1) in the Reaction Formula 2 according to an example of the present disclosure, and the dotted line indicates a graph of the polymer represented by H-poly(1) in the Reaction Formula 3 according to an example of the present disclosure.

FIG. 8 is an infrared spectroscopy graph of the polymer represented by H-poly(1) in the Reaction Formula 3 according to an example of the present disclosure.

FIG. 9 is a graph of transmittance in the UV-visible region of the polymer represented by H-poly(1) in the Reaction Formula 3 according to an example of the present disclosure.

BEST MODE FOR CARRYING OUT THE INVENTION

Hereinafter, embodiments and examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Hereinafter, embodiments of the present disclosure have been described in detail, but the present disclosure may not be limited thereto.

A first aspect of the present disclosure provides a cyclic olefin polymer that is produced by ring-opening metathesis polymerization of at least one monomer(s) selected from dicyclopentadiene having an epoxy group represented by the following Chemical Formula 1 and tricyclopentadiene having an epoxy group represented by the following Chemical Formula 2; or by ring-opening metathesis polymerization of at least one monomer(s) selected from the dicyclopentadiene having an epoxy group and the tricyclopentadiene having an epoxy group, and a norbornene monomer represented by the following Chemical Formula 3; and the cyclic olefin polymer includes repeating units represented by the following Chemical Formula 4, Chemical Formula 5, Chemical Formula 6, Chemical Formula 7, Chemical Formula 8, or Chemical Formula 9:

[Chemical Formula 1]

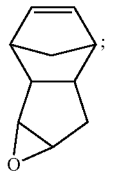

[Chemical Formula 2]

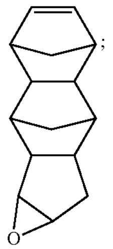

[Chemical Formula 3]

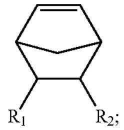

[Chemical Formula 4]

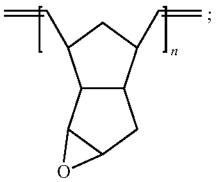

[Chemical Formula 5]

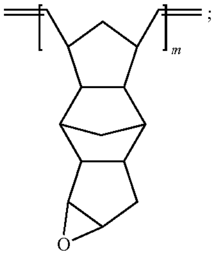

[Chemical Formula 6]

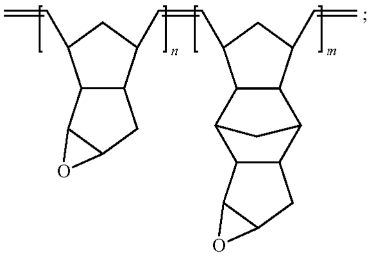

[Chemical Formula 7]

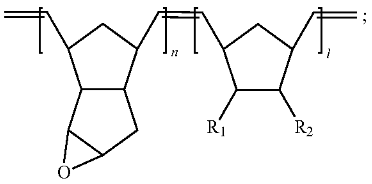

-continued

[Chemical Formula 8]

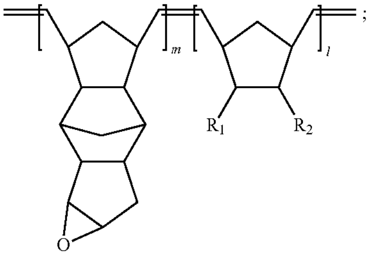

[Chemical Formula 9]

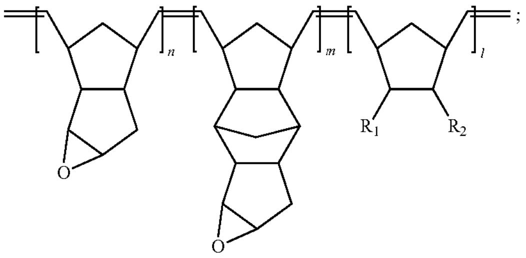

in the above Chemical Formula 3, Chemical Formula 4, Chemical Formula 5, Chemical Formula 6, Chemical Formula 7, Chemical Formula 8, and Chemical Formula 9, n is an integer of 5 to 5,000, m is an integer of 5 to 5,000, l is an integer of 5 to 5,000 each of $R_1$ and $R_2$ is independently selected from hydrogen, a linear or branched alkyl group having 1 to 20 carbon atoms, an ester group (—$COOR_3$), or an amide group (—$CONHR_3$), and $R_3$ is a linear or branched alkyl group having 1 to 20 carbon atoms.

In an embodiment of the present disclosure, the cyclic olefin polymer may include a cyclic olefin polymer produced by ring-opening metathesis polymerization of at least one monomer(s) selected from the dicyclopentadiene having an epoxy group represented by Chemical Formula 1 and the tricyclopentadiene having an epoxy group represented by the Chemical Formula 2; or a cyclic olefin copolymer produced by ring-opening metathesis polymerization of at least one monomer(s) selected from the dicyclopentadiene having an epoxy group represented by Chemical Formula 1 and the tricyclopentadiene having an epoxy group represented by Chemical Formula 2, and a norbornene monomer represented by the following Chemical Formula 3.

In an embodiment of the present disclosure, the linear or branched alkyl group having 1 to 20 carbon atoms includes linear or branched alkyl groups having 1 to 12 carbon atoms, 1 to 10 carbon atoms, 1 to 8 carbon atoms, or 1 to 5 carbon atoms and all possible isomers thereof. For example, the alkyl or alkyl groups may be methyl group(Me), ethyl group(Et), n-propyl group($^{n}$Pr), iso-propyl group($^{i}$Pr), n-butyl group($^{n}$Bu), iso-butyl group($^{i}$Bu), tert-butyl group (tert-Bu, $^{t}$Bu), sec-butyl group(sec-Bu, $^{sec}$Bu), n-pentyl group($^{n}$Pe), iso-pentyl group($^{iso}$Pe), sec-pentyl group($^{sec}$Pe), tert-pentyl group($^{t}$Pe), neo-pentyl group($^{neo}$Pe), 3-pentyl group, n-hexyl group, iso-hexyl group, heptyl group, 4,4-dimethyl pentyl group, octyl group, 2,2,4-trimethyl pentyl group, nonyl group, decyl group, undecyl group, dodecyl group, and isomers thereof, but may not be limited thereto.

In an embodiment of the present disclosure, a polydispersity index of the cyclic olefin polymer may be about 1 to about 1.3. In an embodiment of the present disclosure, a polydispersity index of the cyclic olefin polymer may be about 1 to about 1.2, about 1 to about 1.1, about 1.1 to about 1.3, about 1.1 to about 1.2, or about 1.2 to about 1.3.

A second aspect of the present disclosure provides a hydrogenated cyclic olefin polymer that is produced by hydrogenation of a cyclic olefin polymer of the first aspect, and the hydrogenated cyclic polymer includes repeating units represented by the following Chemical Formula 10, Chemical Formula 11, Chemical Formula 12, Chemical Formula 13, Chemical Formula 14, or Chemical Formula 15:

[Chemical Formula 10]

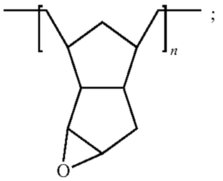

[Chemical Formula 11]

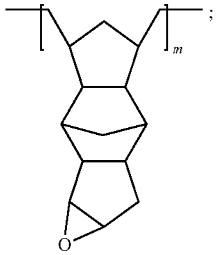

[Chemical Formula 12]

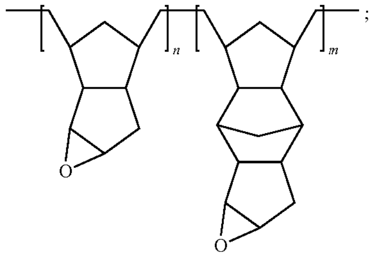

[Chemical Formula 13]

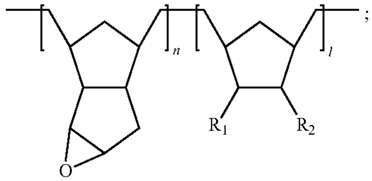

[Chemical Formula 14]

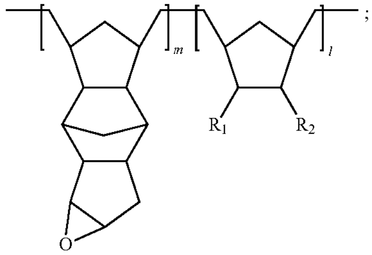

-continued

[Chemical Formula 15]

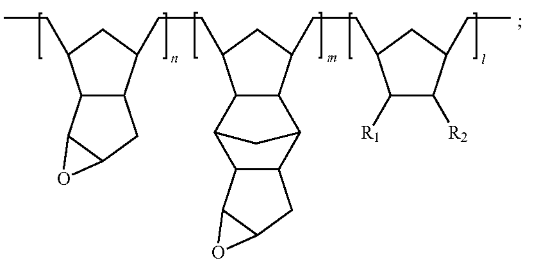

in the above Chemical Formula 10, Chemical Formula 11, Chemical Formula 12, Chemical Formula 13, Chemical Formula 14, and Chemical Formula 15, n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group (—$COOR_3$), or an amide group (—$CONHR_3$), and $R_3$ is a linear or branched alkyl group having 1 to 20 carbon atoms.

Detailed descriptions of the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

In an embodiment of the present disclosure, the linear or branched alkyl group having 1 to 20 carbon atoms includes linear or branched alkyl groups having 1 to 12 carbon atoms, 1 to 10 carbon atoms, 1 to 8 carbon atoms, or 1 to 5 carbon atoms and all possible isomers thereof. For example, the alkyl or alkyl groups may be methyl group(Me), ethyl group(Et), n-propyl group($^{n}$Pr), iso-propyl group($^{i}$Pr), n-butyl group($^{n}$Bu), iso-butyl group($^{i}$Bu), tert-butyl group (tert-Bu, $^{t}$Bu), sec-butyl group(sec-Bu, $^{sec}$Bu), n-pentyl group($^{n}$Pe), iso-pentyl group($^{iso}$Pe), sec-pentyl group($^{sec}$Pe), tert-pentyl group($^{t}$Pe), neo-pentyl group($^{neo}$Pe), 3-pentyl group, n-hexyl group, iso-hexyl group, heptyl group, 4,4-dimethyl pentyl group, octyl group, 2,2,4-trimethyl pentyl group, nonyl group, decyl group, undecyl group, dodecyl group, and isomers thereof, but may not be limited thereto.

In an embodiment of the present disclosure, the hydrogenated cyclic olefin polymer may be used in preparing an optically-isotropic film, but may not be limited thereto.

In an embodiment of the present disclosure, the hydrogenated cyclic olefin polymer is introduced with an epoxy functional group that is a small-sized polar functional group, and thus, a chain-chain interaction may be increased.

In an embodiment of the present disclosure, the hydrogenated cyclic olefin polymer may have a glass transition temperature of at least about 150° C., or at least about 160° C.

In an embodiment of the present disclosure, the hydrogenated cyclic olefin polymer has a high solubility in chlorinated solvents. Therefore, a polymer film can be easily obtained by a solution casting method.

In an embodiment of the present disclosure, a film may have a transmittance of about at least 80%, about at least 83%, or about at least 85% in a visible light region, but may not be limited thereto.

In an embodiment of the present disclosure, the hydrogenated cyclic olefin polymer may be applied to a broad range of applications including optical devices, packaging, electronics, medical devices, and microfluidic devices, but may not be limited thereto.

In an embodiment of the present disclosure, the hydrogenated cyclic olefin polymer may have low birefringence, high transparency, high thermal stability, and high chemical resistance.

A third aspect of the present disclosure provides a method of preparing a hydrogenated cyclic olefin polymer including: (a) polymerizing at least one monomer(s) selected from dicyclopentadiene having an epoxy group represented by the following Chemical Formula 1 and tricyclopentadiene having an epoxy group represented by the following Chemical Formula 2; or at least one monomer(s) selected from the dicyclopentadiene having an epoxy group and the tricyclopentadiene having an epoxy group, and a norbornene monomer represented by the following Chemical Formula 3; in the presence of a first-generation Grubbs catalyst to obtain a cyclic olefin polymer; and (b) hydrogenating the cyclic olefin polymer to obtain a hydrogenated cyclic olefin polymer that includes repeating units represented by the following Chemical Formula 10, Chemical Formula 11, Chemical Formula 12, Chemical Formula 13, Chemical Formula 14, or Chemical Formula 15:

[Chemical Formula 1]

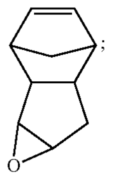

[Chemical Formula 2]

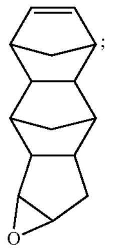

[Chemical Formula 3]

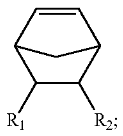

[Chemical Formula 10]

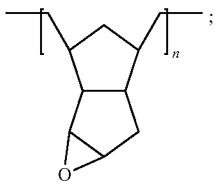

-continued

[Chemical Formula 11]

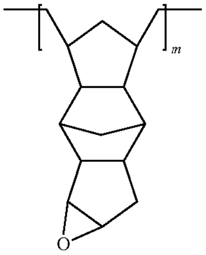

[Chemical Formula 12]

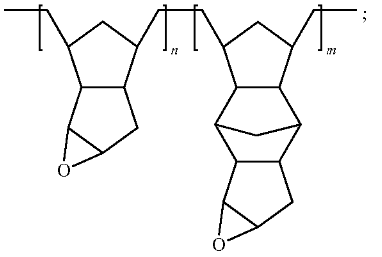

[Chemical Formula 13]

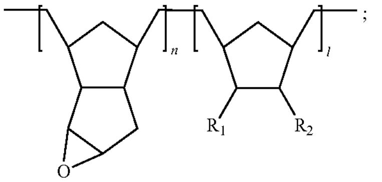

[Chemical Formula 14]

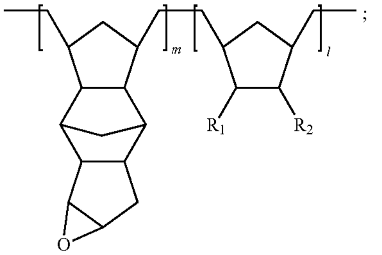

[Chemical Formula 15]

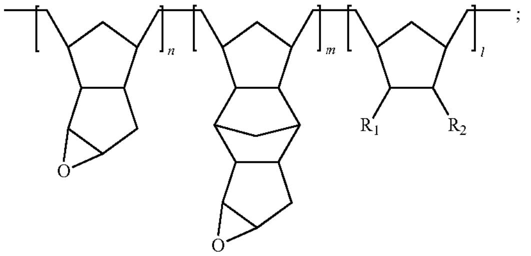

in the above Chemical Formula 3, Chemical Formula 10, Chemical Formula 11, Chemical Formula 12, Chemical Formula 13, Chemical Formula 14, and Chemical Formula 15, n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group (—$COOR_3$), or an amide group (—$CONHR_3$), and $R_3$ is a linear or branched alkyl group having 1 to 20 carbon atoms.

Detailed descriptions of the third aspect of the present disclosure, which overlap with those of the first aspect and the second aspect of the present disclosure, are omitted hereinafter, but the descriptions of the first aspect and the second aspect of the present disclosure may be identically applied to the third aspect of the present disclosure, even though they are omitted hereinafter.

In an embodiment of the present disclosure, the linear or branched alkyl group having 1 to 20 carbon atoms includes linear or branched alkyl groups having 1 to 12 carbon atoms, 1 to 10 carbon atoms, 1 to 8 carbon atoms, or 1 to 5 carbon atoms and all possible isomers thereof. For example, the alkyl or alkyl groups may be methyl group(Me), ethyl group(Et), n-propyl group($^{n}$Pr), iso-propyl group($^{i}$Pr), n-butyl group($^{n}$Bu), iso-butyl group($^{i}$Bu), tert-butyl group (tert-Bu, $^{t}$Bu), sec-butyl group(sec-Bu, $^{sec}$Bu), n-pentyl group($^{n}$Pe), iso-pentyl group($^{iso}$Pe), sec-pentyl group($^{sec}$Pe), tert-pentyl group($^{t}$Pe), neo-pentyl group($^{neo}$Pe), 3-pentyl group, n-hexyl group, iso-hexyl group, heptyl group, 4,4-dimethyl pentyl group, octyl group, 2,2,4-trimethyl pentyl group, nonyl group, decyl group, undecyl group, dodecyl group, and isomers thereof, but may not be limited thereto.

In an embodiment of the present disclosure, the step of (b) may be performed in the presence of a Pd/C catalyst.

In an embodiment of the present disclosure, a catalyst used for preparing the hydrogenated cyclic olefin polymer according to embodiments of the present disclosure does not have reactivity with the epoxy functional group. Therefore, a side reaction may not occur in polymerization and hydrogenation.

In an embodiment of the present disclosure, the hydrogenated cyclic olefin polymer further including a norbornene monomer may have improved properties such as tensile strength, elasticity, or adhesion.

Hereinafter, the present disclosure will be explained in more detail with reference to Examples. However, the following Examples are illustrative only for better understanding of the present disclosure but do not limit the present disclosure.

MODE FOR CARRYING OUT THE INVENTION

Examples

1. Experiment Design

The following experiment was conducted to prepare a cyclic olefin-based polymer having a glass transition temperature of at least 150° C., high-temperature durability and high transmittance through synthesis and ring-opening metathesis polymerization of monomers introduced with an epoxy functional group, and a remaining functional group in each polymerization process was identified through NMR.

2. Experiment

2.1 Synthesis of Dicyclopentadiene Introduced with an Epoxy Functional Group Dicyclopentadiene introduced with an epoxy functional group was synthesized by a method shown in the following Reaction Formula 1.

[Reaction Formula 1]

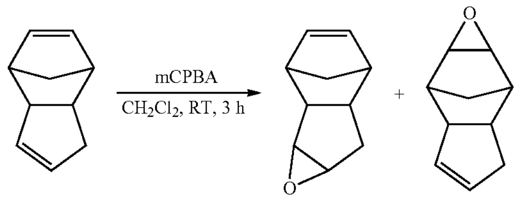

1 2

6.78 g (51.3 mmol) of dicyclopentadiene (DCPD) was put into a 1 L one-neck round flask and dissolved by the addition of 50 mL of anhydrous dichloromethane ($CH_2Cl_2$). After 11.4 g (50.9 mmol) of meta-chloroperoxybenzoic acid ($C_7H_5ClO_3$) was dissolved in 100 mL of anhydrous dichloromethane, which is the same kind of solvent, the resultant solution was slowly put into a round flask by dividing it in three parts. The solution in the round flask was stirred for three hours at room temperature under ambient conditions, and the produced white suspension was filtered through a celite pad. The filtrate was extracted continuously with 10 wt % of a sodium bicarbonate ($NaHCO_3$) aqueous solution, dried with anhydrous magnesium sulfate ($MgSO_4$), and then concentrated in a vacuum. The residue was purified by silica gel column chromatography using ethyl acetate-hexane (with a volume ratio of 1:9) as an eluent to obtain 2.35 g of a white solid.

To increase the synthesis efficiency, as for two monomer compounds 1 and 2 obtained in a synthesis process of a dicyclopentadiene monomer introduced with an epoxy functional group as shown in the Reaction Formula 1, a monomer compound 1 can be polymerized without any pretreatment for isolating each compound. In this case, the ratio of the two monomers in a mixture is identified through an NMR spectrum and polymerization is carried out to obtain the same polymer.

Referring to FIGS. 1A and 1B, $^1$H NMR spectrum and $^{13}$C NMR spectrum analysis were performed to identify a functional group remaining in dicyclopentadiene introduced with an epoxy functional group.

$^1$H NMR (400 MHz, $CDCl_3$, ppm): δ 6.10 (dd, J=8.7, 2.9 Hz, 2H, C═C—H), 3.33 (t, J=2.5 Hz, 1H, CH), 3.17 (d, J=2.5 Hz, 1H, CH), 2.93 (td, J=3.0, 1.5 Hz, 1H, CH), 2.82 (m, 2H, $CH_2$), 2.55 (tt, J=8.1, 3.9 Hz, 1H, CH), 1.91 (dd, J=14.9, 9.0 Hz, 1H, CH), 1.51 (dt, J=8.3, 1.9 Hz, 1H, CH), 1.39-1.31 (m, 2H, $CH_2$). $^{13}$C NMR (101 MHz, $CDCl_3$, ppm): δ 135.19 (s, C═C), 135.04 (s, C═C), 62.03 (s, C—O), 60.92 (s, C—O), 52.15 (s, CH), 51.15 (s, CH), 46.59 (s, $CH_2$), 44.79 (s, CH), 44.08 (s, CH), 31.22 (s, $CH_2$). Anal. Calcd. For $C_{10}H_{12}O$: C, 81.04; H, 8.16. Found: C, 81.22; H, 8.20.

2.2 Synthesis of Cyclic Olefin Polymer Introduced with an Epoxy Functional Group Cyclic olefin polymer introduced with an epoxy functional group was synthesized by a method shown in the following Reaction Formula 2.

[Reaction Formula 2]

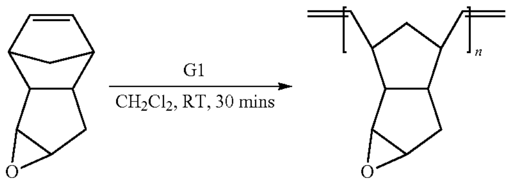

1 poly(1)

A first-generation Grubbs catalyst (G1; [$(PCy_3)_2(Cl)_2$Ru═CHPh]) (5.1 mg, 6.0 μmol) was dissolved in 1.0 mL of dichloromethane in a 4 mL vial. After 180 mg (1.2 mmol) of dicyclopentadiene introduced with an epoxy functional group was dissolved in 2.0 mL of dichloromethane, the dissolved solution was rapidly added to the vial with a syringe at room temperature under nitrogen conditions. After 30 minutes, 0.5 mL of ethyl vinyl ether was added to the reaction mixture to terminate the reaction. After the solution was stirred for 15 minutes and settled in methanol, a resultant precipitate was collected and dried to obtain a white solid.

Referring to FIGS. 2A and 2B, $^1$H NMR spectrum and $^{13}$C NMR spectrum analysis were performed to identify a functional group remaining in cyclic olefin polymer represented by poly(1) in the Reaction Formula 2.

$^1$H NMR (400 MHz, $CDCl_3$, ppm): δ 5.53-5.29 (br, 2H), 3.55-3.42 (br, 1H), 3.40-3.27 (br, 1H), 3.10-2.51 (br, 3H), 2.47-2.30 (br, 1H), 2.02-1.84 (br, 1H), 1.80-1.64 (br, 1H), 1.52-1.21 (br, 2H). $^{13}$C NMR (101 MHz, $CDCl_3$, ppm): δ 131.48, 130.56, 59.70, 59.52, 48.77, 44.83, 44.73, 44.61, 44.47, 43.11, 42.92, 36.44, 29.89. Anal. Calcd. For $C_{10}H_{12}O$: C, 81.04; H, 8.16. Found: C, 79.89; H, 8.21.

2.3 Hydrogenation of Cyclic Olefin Polymer Introduced with an Epoxy Functional Group Hydrogenation of cyclic olefin polymer introduced with an epoxy functional group was synthesized by a method shown in the following Reaction Formula 3.

[Reaction Formula 3]

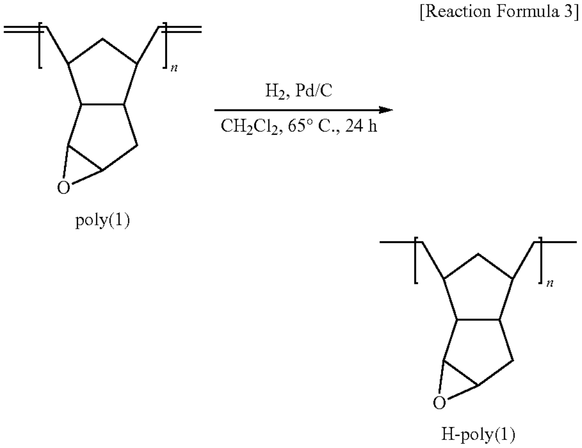

poly(1)

H-poly(1)

160 mg of the cyclic olefin-based polymer obtained in the process 2.2 was dissolved in 25 mL of anhydrous dichloromethane. The solution was transferred to an autoclave and then, 10 wt % of Pd/C (40.0 mg) was added thereto. The mixture solution was stirred violently at 65° C. for 24 hours under hydrogen pressure of 35 bar and then cooled to room temperature. The mixture was isolated by filtration and concentrated under reduced pressure. The concentrated mixture solution was poured into methanol and then, a resultant precipitate was collected and dried to obtain a white solid.

Referring to FIGS. 3A, 3B and 4, $^{1}$H NMR spectrum, $^{13}$C NMR spectrum, and $^{1}$H-$^{13}$C HSQC NMR spectrum analysis was performed to identify a functional group remaining in cyclic olefin polymer represented by H-poly(1) in the Reaction Formula 3.

$^{1}$H NMR (400 MHz, $CDCl_3$, ppm): δ 3.54-3.45 (br, 1H), 3.39-3.30 (br, 1H), 2.77-2.66 (br, 1H), 2.35-2.24 (br, 1H), 1.99-1.85 (br, 2H), 1.83-1.71 (br, 2H), 1.50-1.11 (br, 5H), 0.92-0.72 (br, 1H). $^{13}$C NMR (101 MHz, $CDCl_3$, ppm): δ 59.68, 59.14, 47.03, 43.30, 43.15, 42.23, 40.12, 39.89, 37.66, 31.89, 29.94, 29.58, 28.45. Anal. Calcd. For $C_{10}H_{14}O$: C, 79.96; H, 9.39. Found: C, 78.10; H, 9.29.

2.4 Synthesis of Transparent Polymer Film Including Epoxy Functionalization Polymer The cyclic olefin-based polymer obtained in the process 2.3 was put into a vial with a screw cap and tetrachloroethane was added thereto. The mixture was heated at 50° C. and dissolved with stirring until it was completely dissolved. After the cyclic olefin-based polymer was completely dissolved, it was cooled to room temperature to obtain a transparent solution. The transparent solution was poured onto a Teflon plate with a syringe filter and then, all the volatile materials were evaporated to prepare a film. The prepared film was further dried in a vacuum oven at 60° C. for 24 hours. The thickness of the obtained film was measured using a Mitutoyo IP65 coolant-proof micrometer.

Referring to FIG. 5, the transparent polymer film prepared in the process 2.4 can be confirmed.

3. Characteristic Evaluation

3.1 Characteristics of Non-Epoxidized Polymers

According to the previously published related document entitled "New catalysts for linear polydicyclopentadiene synthesis" (M. J. Abadie, M. Dimonie, Christine Couve, V. Dragutanc), linear polydicyclopentadiene (LPDCPD) has a glass transition temperature of 53° C. The following Table 1 is polymer-related data as a result of ring-opening polymerization of dicyclopentadiene (DCPD), which was performed at 25° C. using a tungsten catalyst:

Also, another previously published related document entitled "Preparation and characterization of cycloolefin polymer based on dicyclopentadiene (DCPD) and dimethanooctahydronaphthalene (DMON)" (Vania Tanda Widyaya, Huyen Thanh Vo, Robertus Dhimas Dhewangga Putra, Woon Sung Hwang, Byoung Sung Ahn, Hyunjoo Lee) discloses characteristics of a cycloolefin polymer (COP) prepared as shown in the following Reaction Formula 4.

[Reaction Formula 4]

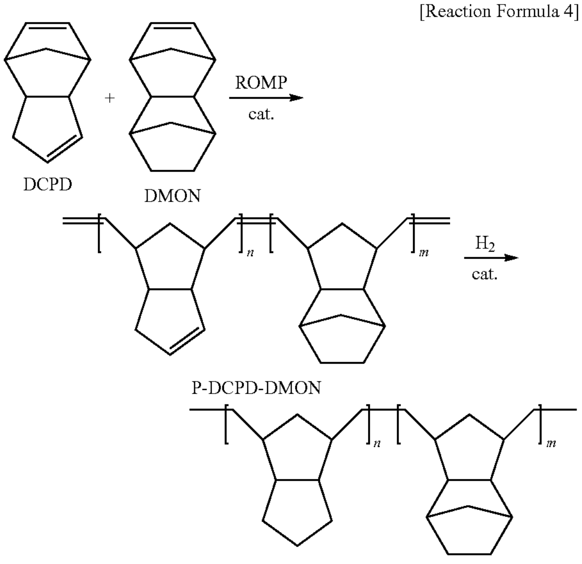

DCPD
DMON
P-DCPD-DMON
H-p-DCPD-DMON

The cycloolefin polymer (COP) has a structure in which cycloolefin and ethylene are regularly repeated, and, thus, the structure of cycloolefin determines a glass transition temperature of the COP. The COP prepared by polymerizing dicyclopentadiene (DCPD) exhibits a low glass transition temperature of 100° C. A double bond in a 5-membered ring of dicyclopentadiene is not active to ring-opening polymerization, but can also be polymerized in a very high temperature environment.

TABLE 1

| Catalyst system | [catalyst] (mol/L × $10^3$) | Si/W | Conversion rate after 4 hours (%) | Gel content (%) | $M_o$ | $M_n$ |
|---|---|---|---|---|---|---|
| $WCl_6$—$SiAll_4$ | 0.5 | 1 | 52 | 0 | 39.000 | 22.000 |
| $WCl_6$—$SiAll_4$ | 1.12 | 1 | 98 | 53 | 39.900 | 19.000 |
| $WCl_6$—$SiAll_4$ | 1.7 | 1 | 100 | 0 | — | — |
| $WOCl_4$—$SiAll_4$ | 0.8 | 1 | 87 | 0 | 58.000 | 28.000 |
| $WOCl_4$—$SiAll_4$ | 3.4 | 1 | 100 | 0 | 46.000 | 22.000 |
| $WOCl_4$—$SiAll_4$ | 5 | 2 | 100 | 0 | 36.000 | 18.000 |
| $WOCl_4$—$SiMe_2All_2$ | 3.4 | 2 | 100 | 0 | 57.000 | 30.000 |
| $WOCl_6$—$H_2O$—$SiMe_2All_2$ $H_2O/WCl_6$ = 0.7[a] | 3.4 | 2 | 100 | 0 | 50.100 | 26.000 |
| $WOCl_6$—$H_2O$—$SiMe_2All_2$ $H_2O/WCl_6$ = 0.7[b] | 3.4 | 2 | 100 | 0 | 234 | 41.400 |

In the above Table 1, All represents an allyl group, superscript "a" means being inactivated immediately after the completion of polymerization, and superscript "b" means being inactivated 20 hours after the completion of polymerization.

DMON (1,4,5,8-dimethano-1,2,3,4,4a,5,8,8a-octahydronaphthalene) shown in the above Reaction Formula 4 can be easily prepared through a Diels-Alder reaction between cyclopentadiene and norbornene. Hydrogenated cycloolefin polymers (H-p-DCPD, H-p-$DCPD_{0.75}$-$DMON_{0.25}$, H-p-

$DCPD_{0.5}$-$DMON_{0.5}$, and H-p-DMON) exhibit a polydispersity index (PDI) in the range of 2.4 to 2.8.

3.2 Characteristics of Epoxidized Polymers According to the Present Disclosure

The following Table 2 shows the results of characteristic evaluation on poly(1) and H-poly(1) in the Reaction Formula 3 according to the present disclosure.

TABLE 2

| Entry | Sample | $[M]_o/[I]_o$ | Yield (%) | PDI ($M_w/M_n$) | $T_g$(° C.) | $T_{d5}$(° C.) | transmittance (%) | | thickness (μm) |
|---|---|---|---|---|---|---|---|---|---|
| 1 | Poly(1) | 200 | 96 | 1.15 | 204 | 360 | — | — | 10 |
| 2 | H-poly(1) | 200 | 95 | — | 167 | 364 | 82 (440 nm) | 88 (550 nm) | 10 |

3.3 Polydispersity Index (PDI)

The PDI of poly(1) in the above Reaction Formula 2 was measured.

3.4 Thermogravimetric Analysis

To check the thermal stability of the poly(1) and the H-poly(1), the temperature of each was measured by using a thermogravimetric analyzer under nitrogen conditions when the weight of each of the poly(1) and the H-poly(1) decreased by 5% while increasing the temperature at a rate of 5° C./min.

Referring to FIG. 6, the poly(1) is indicated by a solid line and the H-poly(1) is indicated by a dotted line.

3.5 Differential Scanning Calorimetry Analysis

To measure the glass transition temperature of the poly(1) and the H-poly(1), differential scanning calorimetry analysis was performed under nitrogen conditions.

Referring to FIG. 7, the poly(1) has a glass transition temperature of 204° C. as indicated by a solid line, and the H-poly(1) has a glass transition temperature of 167° C. as indicated by a dotted line.

3.6 Infrared Spectroscopy

Referring to FIG. 8, the H-poly(1) was analyzed by infrared spectroscopy.

3.7 the Transmittance of UV-Vis Region

The transmittance of the H-poly(1) in a UV-VIS region was analyzed.

Referring to FIG. 9, the H-poly(1) exhibited a transmittance of 82% at a wavelength of 400 nm and a transmittance of 88% at a wavelength of 550 nm.

4. Conclusion

The H-poly(1) produced in the above-described experiment exhibited a glass transition temperature of 167° C., a transmittance of 82% at a wavelength of 400 nm and a transmittance of 88% at a wavelength of 550 nm, which confirms that the H-poly(1) can be applied to a film having high-temperature durability and high transmittance.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A hydrogenated cyclic olefin polymer produced by hydrogenation of a cyclic olefin polymer produced by ring-opening metathesis polymerization of at least one monomer(s) selected from the group consisting of dicyclopentadiene including an epoxy group represented by the following Chemical Formula 1 and tricyclopentadiene including an epoxy group represented by the following Chemical Formula 2; or by ring-opening metathesis polymerization of at least one monomer(s) selected from the group consisting of dicyclopentadiene including an epoxy group represented by the following Chemical Formula 1, tricyclopentadiene including an epoxy group an epoxy group represented by the following Chemical Formula 2, and a norbornene monomer represented by the following Chemical Formula 3:

[Chemical Formula 1]

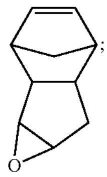

;

[Chemical Formula 2]

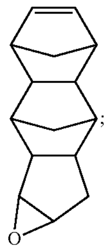

;

[Chemical Formula 3]

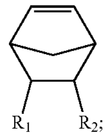

;

wherein the hydrogenated cyclic polymer includes repeating units represented by the following Chemical Formula 10, Chemical Formula 11, Chemical Formula 12, Chemical Formula 13, Chemical Formula 14, or Chemical Formula 15:

[Chemical Formula 10]

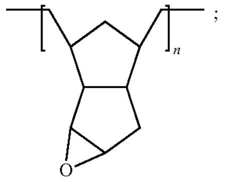

[Chemical Formula 11]

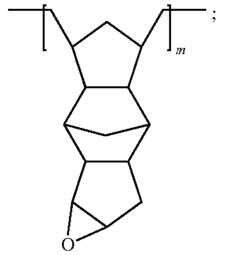

[Chemical Formula 12]

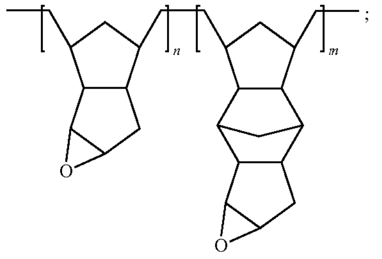

[Chemical Formula 13]

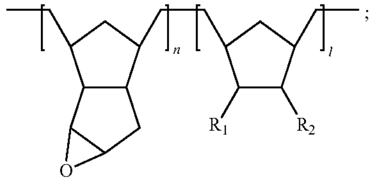

[Chemical Formula 14]

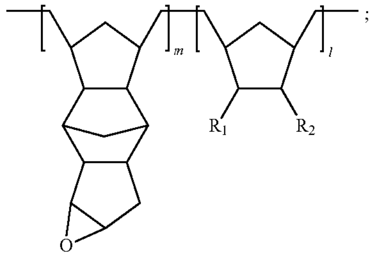

[Chemical Formula 15]

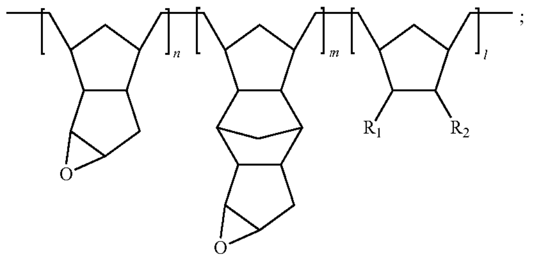

wherein, in the above Chemical Formula 10, Chemical Formula 11, Chemical Formula 12, Chemical Formula 13, Chemical Formula 14, and Chemical Formula 15:

n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group ($—COOR_3$), or an amide group ($—CONHR_3$), and $R_3$ is a linear or branched alkyl group having 1 to 20 carbon atoms;

wherein the hydrogenated cyclic olefin polymer is used in preparing an optically isotropic film; and wherein the optically isotropic film has a glass transition temperature of at least 150° C.

2. The hydrogenated cyclic olefin polymer of claim 1, wherein a polydispersity index of the cyclic olefin polymer is 1 to 1.3.

3. An optically isotropic film, comprising a hydrogenated cyclic olefin polymer produced by hydrogenation of a cyclic olefin polymer, wherein the cyclic olefin polymer is produced by ring-opening metathesis polymerization of at least one monomer(s) selected from the group consisting of dicyclopentadiene including an epoxy group represented by the following Chemical Formula 1 and tricyclopentadiene including an epoxy group represented by the following Chemical Formula 2; or by ring-opening metathesis polymerization of at least one monomer(s) selected from the group consisting of dicyclopentadiene including an epoxy group represented by the following Chemical Formula 1, tricyclopentadiene including an epoxy group represented by the following Chemical Formula 2, and a norbornene monomer represented by the following Chemical Formula 3:

[Chemical Formula 1]

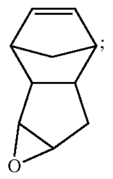

[Chemical Formula 2]

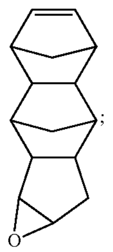

[Chemical Formula 3]

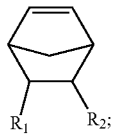

wherein the hydrogenated cyclic polymer includes repeating units represented by the following Chemical Formula 10, Chemical Formula 11, Chemical Formula 12, Chemical Formula 13, Chemical Formula 14, or Chemical Formula 15:

[Chemical Formula 10]

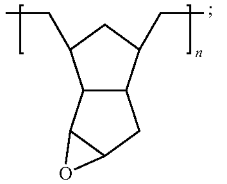

[Chemical Formula 11]

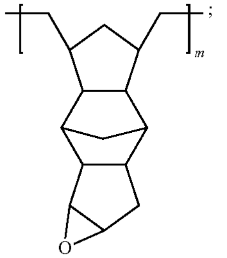

[Chemical Formula 12]

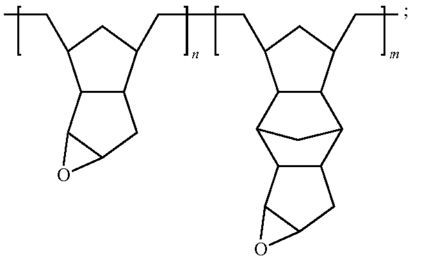

[Chemical Formula 13]

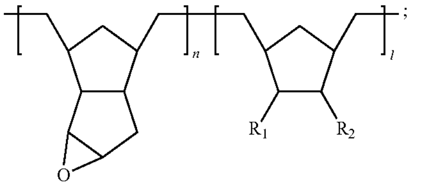

[Chemical Formula 14]

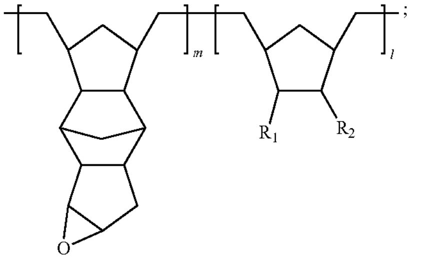

[Chemical Formula 15]

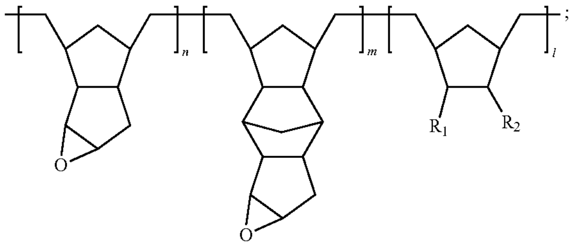

wherein, in the above Chemical Formula 10, Chemical Formula 11, Chemical Formula 12, Chemical Formula 13, Chemical Formula 14, and Chemical Formula 15:

n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group (—$COOR_3$), or an amide group (—$CONHR_3$), and $R_3$ is a linear or branched alkyl group having 1 to 20 carbon atoms; and wherein the optically isotropic film has a glass transition temperature of at least 150° C.

4. The optically isotropic film of claim 3, wherein the optically isotropic film has a transmittance of at least 80% in a visible light region.

5. A method of preparing a hydrogenated cyclic olefin polymer, comprising:

(a) polymerizing at least one monomer(s) selected from the group consisting of dicyclopentadiene including an epoxy group represented by the following Chemical Formula 1 and tricyclopentadiene including an epoxy group represented by the following Chemical Formula 2; or at least one monomer(s) selected from the group consisting of dicyclopentadiene including an epoxy group the following Chemical Formula 1, tricyclopentadiene including an epoxy group represented by the following Chemical Formula 2, and a norbornene monomer represented by the following Chemical Formula 3; in the presence of a first-generation Grubbs catalyst to obtain a cyclic olefin polymer:

[Chemical Formula 1]

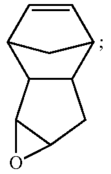

[Chemical Formula 2]

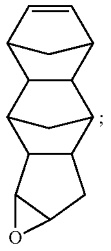

[Chemical Formula 3]

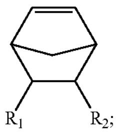

and (b) hydrogenating the cyclic olefin polymer to obtain a hydrogenated cyclic olefin polymer that includes repeating units represented by the following Chemical Formula 10, Chemical Formula 11, Chemical Formula 12, Chemical Formula 13, Chemical Formula 14, or Chemical Formula 15, in the presence of a Pd/C catalyst:

[Chemical Formula 10]

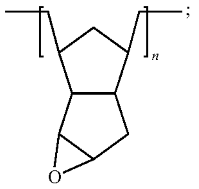

[Chemical Formula 11]

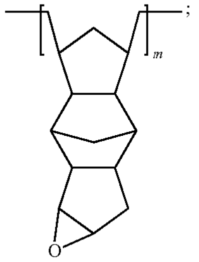

[Chemical Formula 12]

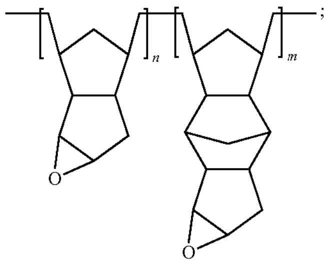

[Chemical Formula 13]

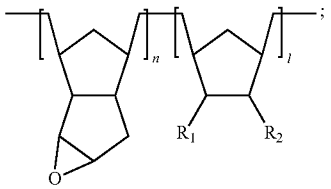

-continued

[Chemical Formula 14]

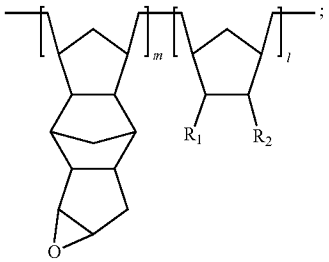

[Chemical Formula 15]

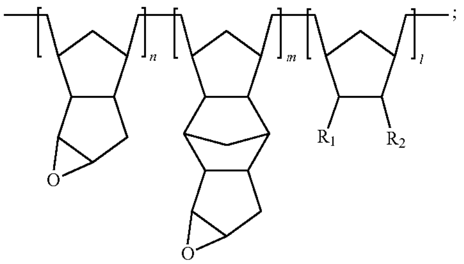

wherein, in the above Chemical Formula 3, Chemical Formula 10, Chemical Formula 11, Chemical Formula 12, Chemical Formula 13, Chemical Formula 14, and Chemical Formula 15:

n is an integer of 5 to 5,000, m is an integer of 5 to 5,000, l is an integer of 5 to 5,000, each of $R_1$ and $R_2$ is independently selected from hydrogen, a linear or branched alkyl group having 1 to 20 carbon atoms, an ester group ($—COOR_3$), or an amide group ($—CONHR_3$), and $R_3$ is a linear or branched alkyl group having 1 to 20 carbon atoms.

* * * * *